(12) United States Patent
Sevar et al.

(10) Patent No.: US 12,366,473 B2
(45) Date of Patent: Jul. 22, 2025

(54) NON-INVASIVE OPEN CHANNEL FLOW METER

(71) Applicant: FLOW-TRONIC S.A., Welkenraedt (BE)

(72) Inventors: Jean-Marie Sevar, Welkenraedt (BE); Martin Scherhaufl, Eidenberg (AT)

(73) Assignee: FLOW-TRONIC S.A., Welkenraedt (BE)

( * ) Notice: Subject to any disclaimer, the term of this patent is extended or adjusted under 35 U.S.C. 154(b) by 570 days.

(21) Appl. No.: 17/423,764

(22) PCT Filed: Jan. 20, 2020

(86) PCT No.: PCT/EP2020/051304
§ 371 (c)(1),
(2) Date: Jul. 16, 2021

(87) PCT Pub. No.: WO2020/148461
PCT Pub. Date: Jul. 23, 2020

(65) Prior Publication Data
US 2022/0113173 A1    Apr. 14, 2022

(30) Foreign Application Priority Data
Jan. 18, 2019 (EP) ..................... 19152604

(51) Int. Cl.
*G01F 1/663* (2022.01)
*G01F 1/002* (2022.01)
(Continued)

(52) U.S. Cl.
CPC .............. *G01F 1/663* (2013.01); *G01F 1/002* (2013.01); *G01S 7/35* (2013.01); *G01S 13/34* (2013.01); *G01S 13/584* (2013.01)

(58) Field of Classification Search
CPC . G01F 1/663; G01F 1/002; G01S 7/35; G01S 13/34; G01S 13/584
See application file for complete search history.

(56) References Cited

U.S. PATENT DOCUMENTS

| | | | | |
|---|---|---|---|---|
| 2001/0050926 | A1* | 12/2001 | Kumar | H04L 1/08 375/347 |
| 2010/0031753 | A1* | 2/2010 | Mayer | G01F 1/663 73/290 R |

(Continued)

FOREIGN PATENT DOCUMENTS

WO    2018-002728 A1    1/2018

OTHER PUBLICATIONS

International Search Report and Written Opinion issued in corresponding International Patent Application No. PCT/EP2020/051304, mailed Apr. 17, 2020, 18 pages.

(Continued)

*Primary Examiner* — Vladimir Magloire
*Assistant Examiner* — Hailey R Le
(74) *Attorney, Agent, or Firm* — Merchant & Gould P.C.

(57) ABSTRACT

A method measures surface velocity of a fluid having a free surface flowing through a pipe or a channel. A microwave beam is sent by patch antenna including an emitting patch area and receiving patch areas parallel to the emitting patch area. Microwave signals reflected by the moving fluid free surface are received on the receiving patch areas separated by a predetermined distance. The patch antennae are either in horizontal or vertical planes parallel to the average fluid velocity. For each microwave signal received, a phase shift between microwave signals received by different patch areas is determined to calculate azimuth angles and azimuth position of reflectors on the fluid surface or to calculate the elevation angle corresponding to each signal received. Based on Doppler frequency shifts between the sent and (Continued)

received microwaves and corresponding phase shifts, lateral and/or longitudinal distribution of the surface velocity of the fluid is calculated.

15 Claims, 12 Drawing Sheets

(51) Int. Cl.
  *G01S 7/35* (2006.01)
  *G01S 13/34* (2006.01)
  *G01S 13/58* (2006.01)

(56) References Cited

U.S. PATENT DOCUMENTS

| | | | | |
|---|---|---|---|---|
| 2011/0074646 A1* | 3/2011 | Snow | ............... | H01Q 19/28 |
| | | | | 343/850 |
| 2015/0007654 A1* | 1/2015 | Fehrenbach | .......... | G01S 13/584 |
| | | | | 73/198 |
| 2015/0253177 A1* | 9/2015 | Blodt | ............... | G01F 23/284 |
| | | | | 324/644 |
| 2016/0138950 A1* | 5/2016 | Sevar | ............... | G01F 1/712 |
| | | | | 73/861 |
| 2018/0003531 A1* | 1/2018 | Rick | ............... | G01F 15/075 |
| 2018/0252802 A1* | 9/2018 | Tong | ............... | G01S 13/26 |
| 2019/0086247 A1* | 3/2019 | Rick | ............... | G01S 17/58 |
| 2019/0393729 A1* | 12/2019 | Contopanagos | ........ | H02J 50/40 |

OTHER PUBLICATIONS

Mutschler, Marc et al, "Time-domain correlation radar for fluid surface velocity estimation using a 77 GHz sensor platform", Proceedings of the 14th European Radar Conference, Oct. 11, 2017, pp. 279-282.

Author Unknown, "System Q-Eye Radar. Pulse-Doppler FFT Technology. Non Contact Open Channel Flow Measurement System.", HydroVision Acoustic Flow Meter, Jun. 30, 2010, pp. 1-4.

* cited by examiner

NON-INVASIVE OPEN CHANNEL FLOW METER

This application is a National Stage Application of PCT/EP2020/051304, filed 20 Jan. 2020, which claims benefit of Ser. No. 19/152,604.5, filed 18 Jan. 2019 in Europe and which applications are incorporated herein by reference. To the extent appropriate, a claim of priority is made to each of the above-disclosed applications.

FIELD OF THE INVENTION

The present invention is related to a non-invasive open channel flowmeter system using a sensor mounted above the flowing fluid.

BACKGROUND

Recent years have shown that water resource management is playing an increasingly important role. The flow measurement in rivers, irrigation channels, municipal and industrial open channel water and wastewater piping systems is becoming increasingly important. Flooding is an increasingly growing problem and accurate flow measurements can help forecasting the extent of the disaster, warn the population and allow protective measures to be taken. Irrigation water is very expensive in some areas and precise flow measurements allow good cost distribution and correct billing. Municipal and industrial wastewater flow measurements are very important since processing of wastewater is important but very expensive.

Numerous open channel flowmeters are available today. One type of flowmeter uses level measurement and uses velocity profiling at different levels to be able to calculate the flow for each specific level. A flow to level plot allows giving the flowrate at all levels. Another type of flowmeter uses primary devices such as flumes or weirs to create the level to flow relation. Area/velocity flowmeters eliminate the need for velocity profiling or the use of primary devices. Most of such devices use wetted sensors placed at or near the bottom of the pipe or channel and are exposed to debris and hang-ups. Sometimes they are very difficult not to say dangerous to install. More recently non-invasive flowmeters have become more and more popular. Among the techniques used are acoustic methods, laser methods, optical methods and microwave methods, the last ones being the most frequently used. All these non-invasive velocity measuring methods detect the velocity at the surface or very near to the surface. In order to calculate the average velocity in the cross section mathematical models or empirical formulas need to be used, which can lead to large inaccuracies.

Accordingly, there is a need for a flowmeter providing the advantages of the non-invasive flowmeters without the drawbacks.

Invasive open channel flowmeter types known in the art have been disclosed in U.S. Pat. Nos. 4,083,246 and 7,672,797. These are area/velocity flowmeters having sensors that are positioned at the bottom of the pipe or channel using a mounting hardware. The velocity is measured in a portion of the wetted area using electromagnetic or acoustic methods, the level is measured using an immerged pressure sensor or lookdown ultrasonic sensor. The major drawback is that those sensors and mounting devices can collect debris carried by the fluid, which debris leads to inaccuracies or malfunctions. In addition, these sensors and mounting devices are exposed to the fluid that may be corrosive or abrasive.

Non-invasive methods for measuring flow are disclosed by U.S. Pat. No. 4,202,211 using an acoustic velocity sensor mounted under the pipe and a lookdown ultrasonic sensor mounted above the fluid surface. Their major drawbacks are the extreme complexity of installation and possible sedimentation that will lead to inaccuracies of the velocity signal.

Another non-invasive method is disclosed in U.S. Pat. No. 5,315,880. A microwave frequency signal is directed to the fluid surface at a specific angle, opposite to the direction of fluid flow. A portion of the signal is reflected and the Doppler frequency between the two beams is used to calculate the fluid surface velocity. A non-invasive lookdown acoustic device is used to measure the level of the fluid. This non-invasive open channel flow measuring technique is an improvement relative to previous measurement techniques, but presents certain drawbacks. The velocity is measured at the surface or at part of the surface of the fluid. The velocities can have large deviations from the average velocity, consequently large errors can be made during the flow calculation which consists in multiplying this velocity with the wetted area.

U.S. Pat. No. 5,811,688 discloses a method using a level dependent surface velocity multiplier to calculate the average velocity. The drawback of this method is that the multipliers are generated by multiple on-site velocity profiling devices at various levels, which are expensive to make and which are sometimes impossible to achieve because of safety issues.

EP patent No. 3 011 278 B discloses a method for calculating the average velocity based on the velocity distribution at the surface of the flowing liquid. While this method is an improvement over earlier methods to calculate the average velocity starting from the measured velocity at the surface or part of the surface of the fluid flow, it has the drawback that the velocity distribution is supposed to be symmetrical, which is only the case if straight runs of sufficient length are available. EP patent No. 2 824 427 A1 discloses a method of measuring the level and the velocity with one antenna using the main lobe which is transmitted at an angle towards the fluid surface to measure the fluid velocity at the surface, and using the side lobe transmitted vertically towards the fluid surface for measuring the distance from the device to the fluid surface.

SUMMARY OF THE INVENTION

The main aim of the present invention is to provide an improved non-invasive method and technology for measuring the flow in an open channel, pipe, or river.

The present invention is related to a method and devices according to the appended independent claims.

Preferred embodiments are described in the dependent claims.

DETAILED DESCRIPTION

Figure 1A:
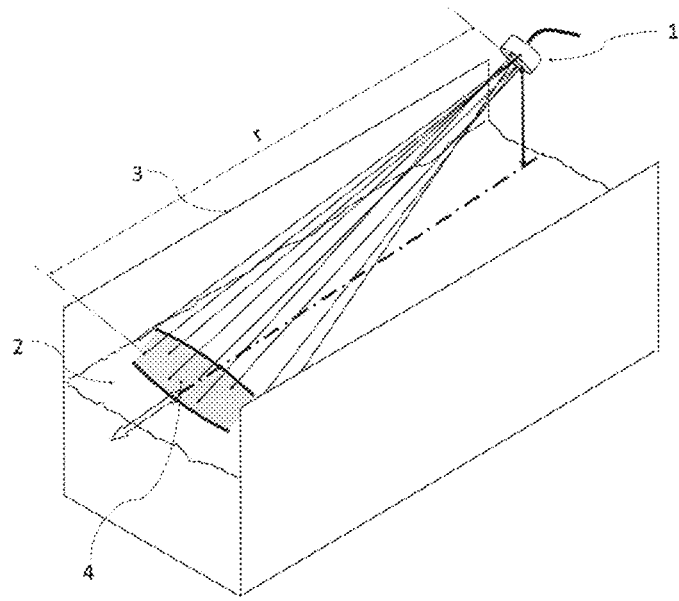
FIG. 1a represents an example of a channel with a measuring velocity sensor according to the invention.

According to the invention, a sensor generates a microwave beam directed towards a fluid surface at a determined angle, wherein said fluid surface reflects a multitude of signals back to the senor. The system is capable of measuring the distance between the target and the radar sensor, the angles of arrival of the impinging radio frequency signal and the target velocity. The sensor has one or more transmitting patch arrays and two or more receiving patch arrays disposed at an angle to the fluid velocity. Each reflected signal is detected by the two or more receiver patch arrays. The signals from the receiving patch arrays are identical but have a phase shift due to the physical distance from the receiving patch arrays and the angle from which the reflected signals are coming. The angle of the moving reflecting fluid scatters can be calculated and the velocity profile within the angle detection can be determined.

This result can be achieved by transmitting a continuous wave signal preferably at a frequency of 24.125 GHz towards the fluid surface. The reflected signals with a Doppler frequency shift are analysed at two or more receiving elements, and the phase shift between the signals at the receiving elements is analysed.

Alternatively, a signal with consecutive up-chirps within the signal band-width B around the centre frequency fc, which can be preferably 61, or 77 GHz, is transmitted towards the fluid surface. The reflected signals are analysed; the delayed reflected up-chirps, the phase shift between consecutive chirps and the phase shift between contiguous receiving devices, will allow calculating the distance, the speed and the impacting angle from each reflecting scatter to the microwave device.

Every single reflecting scatter will have a triple signature, the velocity at which the target moves, i.e. the angle to the axis of the transmitted beam and the distance to the microwave device. This will allow to determine the complete fluid flow surface velocity profile and the distance from the fluid flow to the microwave system using one single antenna.

The present invention uses a device 1 for measuring the surface velocity of a fluid 2 flowing through a pipe or a channel 3, said device 1 comprising a patch antenna 5 with one or more transmitting antenna(e) 6 and m receiving antennae 7 separated by a distance d, said transmitting antenna 6 generating a microwave signal preferably with a centre frequency fc of 77 GHz and said receiving antennae 7 receiving the microwave signal reflected from the surface of the fluid 2. The microwave signals received on the receiving antennae with a phase shift φ allowing the calculation of the angle α to determine the exact azimuth position of the reflector on the fluid surface 2.

According to an example of the invention, the device 1 transmits a signal, which describes a sequence of consecutive linear frequency-modulated continuous waves (up-chirps), impinging at the surface of the fluid 2 where it is reflected. The received signal is a time-delayed version of the transmitted chirp. Both signals are compared using a homodyne receiver; this results in an intermediate frequency signal defined by the frequency difference between the transmitted and received sampling signal which is proportional to the signal propagation time and thus to the distance between the microwave antenna frontend and the target. The target velocity is determined by evaluating the phase difference of consecutive chirps, and the angle of arrival of the impinging radio frequency signal is calculated by evaluating the phase difference at adjacent receiving antennae of the radar system. Hence, the velocity of the target can be determined for a specific angle and range.

Figure 3:
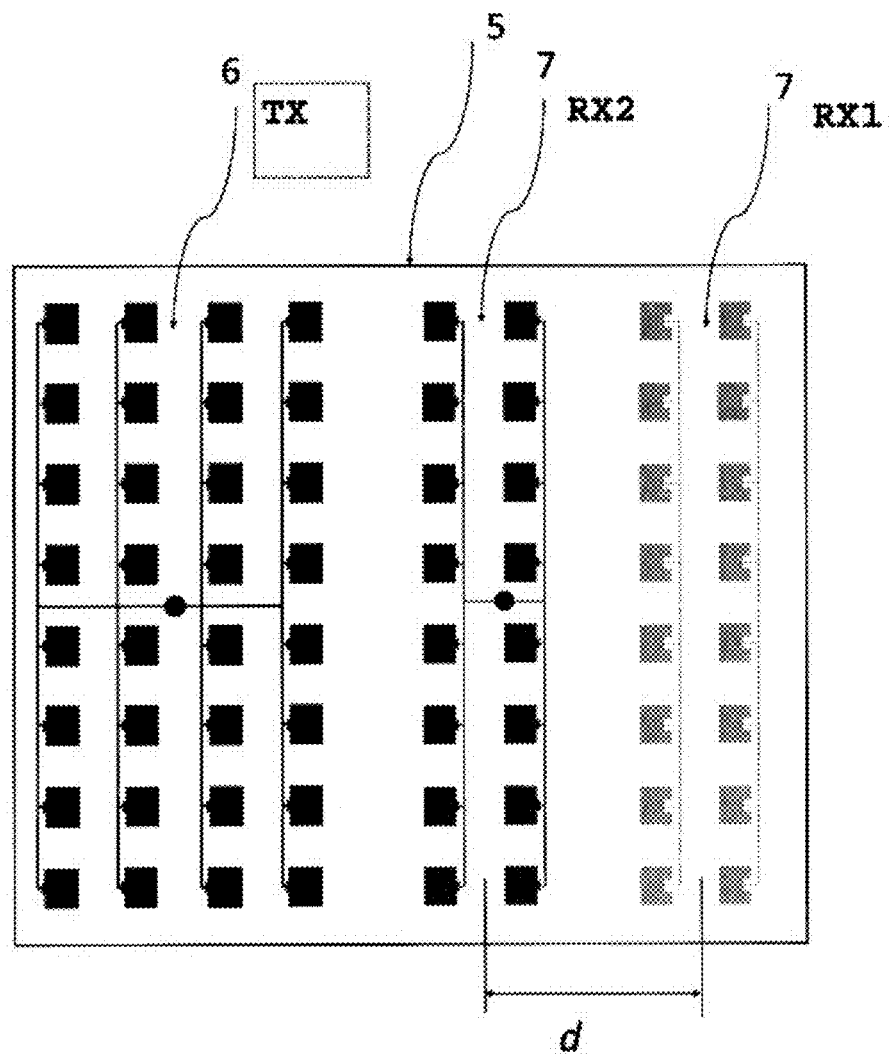
FIG. 3 represents a patch antenna (5) comprising one transmitting patch area TX 6 and two receiving patch areas 7 RX1 and RX2 separated by a distance d.

In a first embodiment, a microwave patch antenna transmitter is used to direct an asymmetrical beam having a large azimuth and small elevation towards the fluid flow at a defined angle (FIG. 1A). In this multiple channel microwave module, which is using a defined transmitting frequency f, a portion of the reflected microwave signal is captured by two or more receiver antennae 7 separated from each other by a defined distance d (FIG. 3).

The Doppler frequency shift difference between the transmitted continuous-wave radar signal at frequency f from the transmitter patch area and the received signals at frequency $f_d$ (frequency with Doppler shift) from the receiving patch areas will allow to calculate the target velocity. The phase shift between the received signals at contiguous receiving patch areas will allow to calculate the angle α from which the reflected signal originates.

Figure 4:
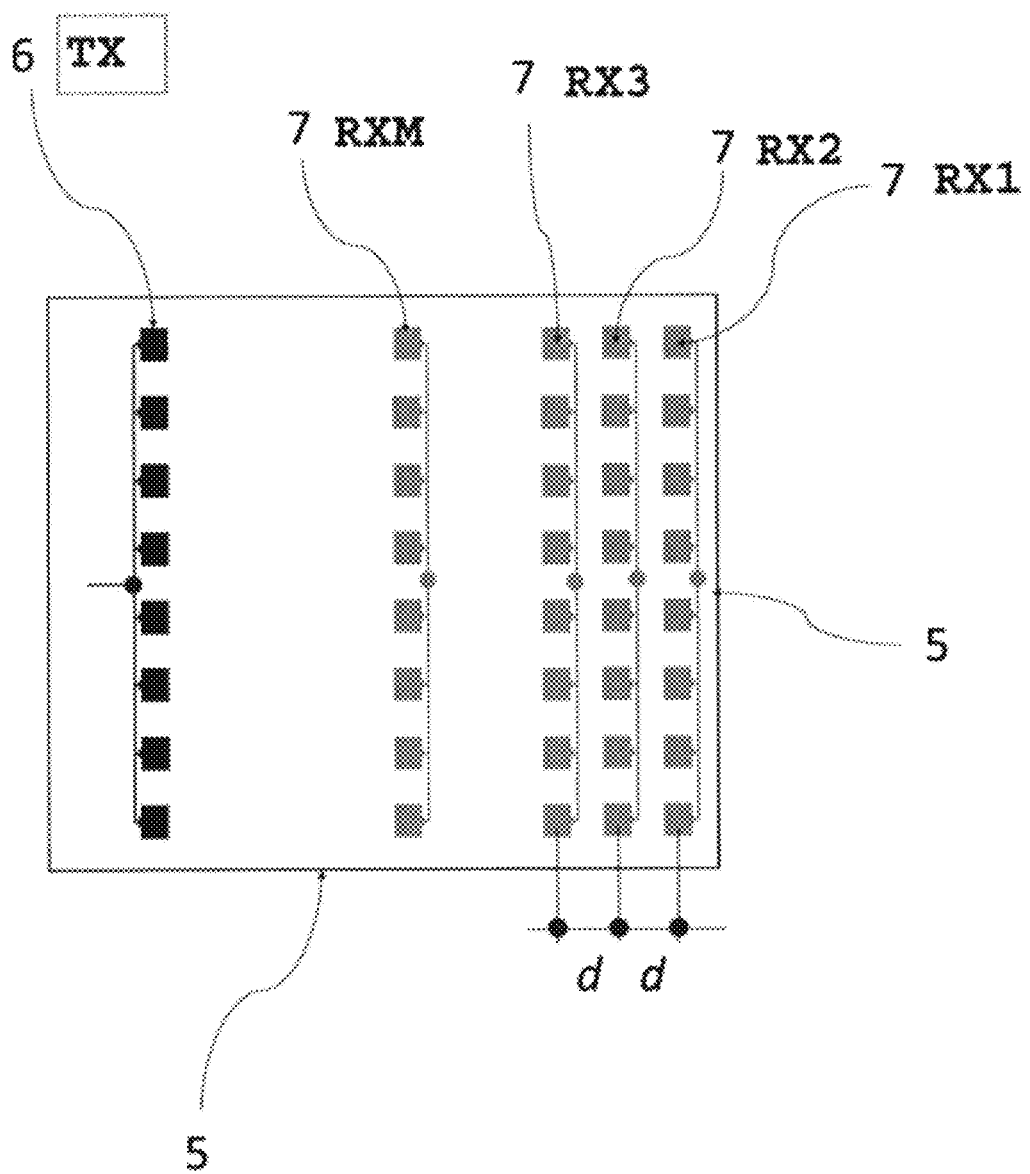
FIG. 4 represents a patch antenna 5 comprising one transmitting patch area (6) and M receiver patch areas (7) separated by a distance d.
Figure 4B:
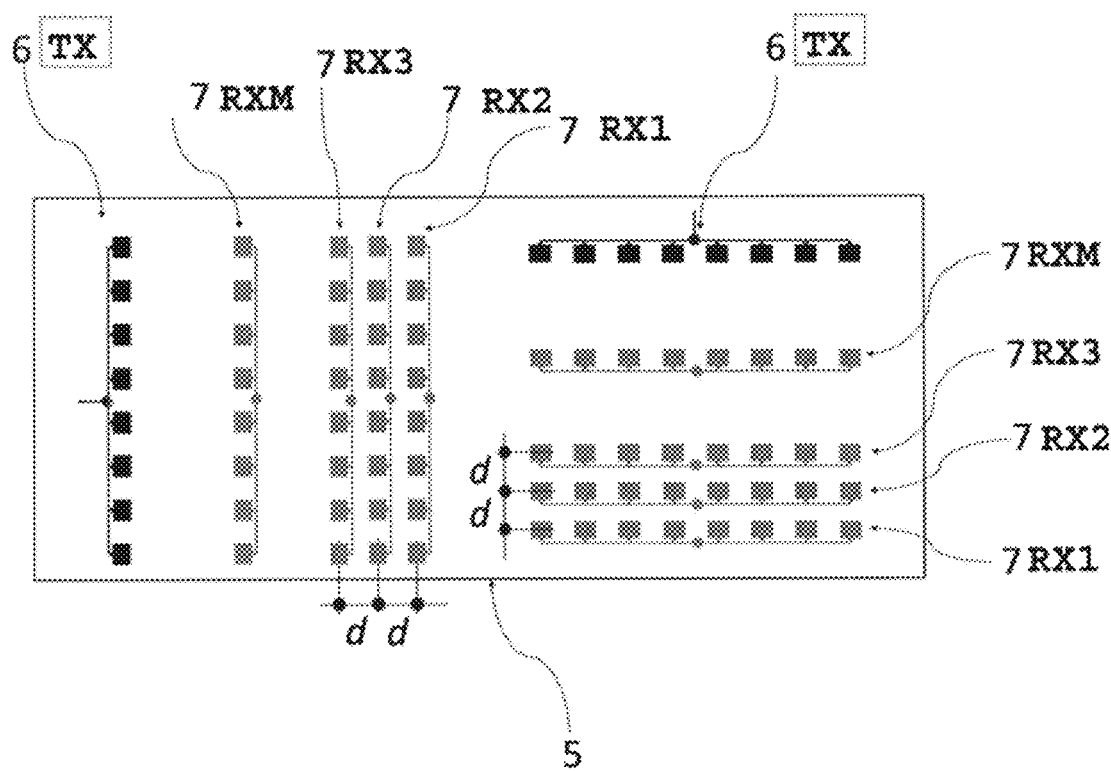
FIG. 4b represents a patch antenna 5 comprising two orthogonal transmitting patch area 6 and two sets of M receiver patch areas 7 separated by a distance d.

In a second embodiment and first arrangement positioning the transmitting and receiving patch areas orthogonal to the fluid flow movement and using a patch antenna 5 as shown in FIG. 4 an asymmetrical micro-wave beam is directed towards the fluid surface at a defined angle θ, said beam having a main lobe with large azimuth and small elevation.

The transmit signal will consist in a sequence of consecutive linear frequency-modulated continuous-waves (up-chirps), impinging at the surface of the fluid where it is reflected, generating a damped and time-delayed version of the transmitted chirp captured by the receiving patch areas, which are going to be analysed to calculate the individual target velocities as well as determining their positions on the fluid surface.

Figure 1B:
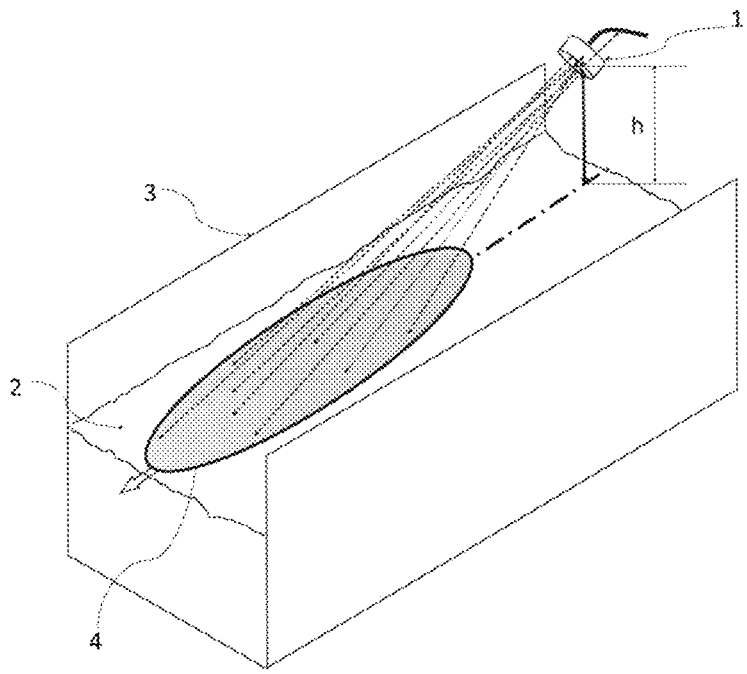
FIG. 1b represents another example of a channel with a measuring velocity sensor according to the invention.

In a second embodiment and second arrangement positioning the transmitting and receiving patch areas parallel to the fluid flow movement and using a patch antenna 5 as shown in FIG. 4 an asymmetrical micro-wave beam is directed towards the fluid surface at a defined angle θ, said beam having a main lobe with small azimuth and large elevation (FIG. 1B).

The transmit signal will consist in a sequence of consecutive linear frequency-modulated continuous-waves (up-chirps), impinging at the surface of the fluid where it is reflected, generating a damped and time-delayed version of the transmitted chirp captured by the receiving patch areas, which will to be analysed to calculate the individual target velocities as well as to determine the distance from the micro-wave antenna to the fluid surface.

Figure 1C:
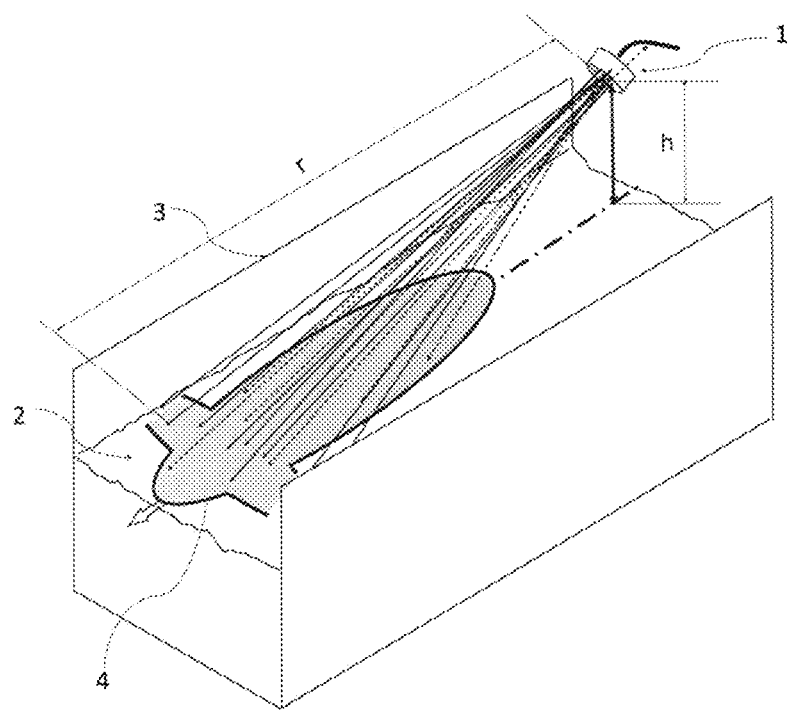
FIG. 1c represents a combination of examples of FIGS. 1a and 1b.

In a third embodiment combining the transmitting and receiving patch areas are positioned orthogonal and parallel to the fluid movement and using a patch antenna (5) as shown in FIG. 4 B, directing two asymmetrical micro-wave beams towards the fluid surface at a defined angle θ, said beams having firstly, a main lobe with large azimuth and small elevation and, secondly, a main lobe with small azimuth and large elevation as shown in FIG. 1 C.

The transmit signals will consist in a sequence of consecutive linear frequency-modulated continuous-waves (up-chirps), impinging at the surface of the fluid where they are reflected, generating damped and time-delayed versions of the transmitted chirp captured by the receiving patch areas, which are going to be analysed to calculate the individual target velocities as well as to determine their positions on the fluid surface and the distance from the micro-wave antenna to the fluid surface.

Figure 2:
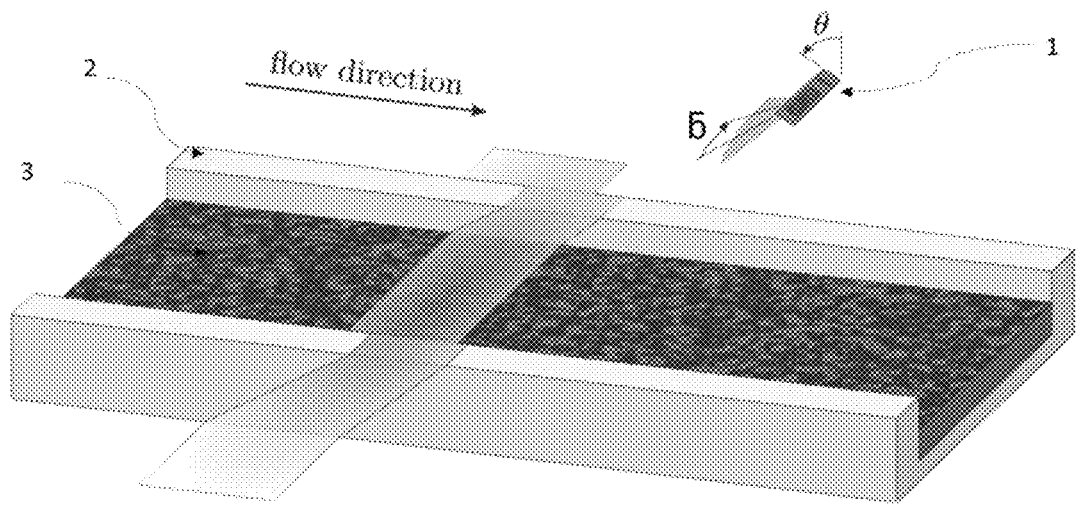
FIG. 2 shows an example of channel according to the invention.

As previously mentioned in the first embodiment, a continuous wave radar signal at defined frequency f preferably at (about) 24.125 GHz is transmitted from the transmitter patch area towards the fluid surface (2) at a defined angle θ as shown in FIG. 2, said beam having a main lobe with large azimuth and small elevation. This will allow the main lobe to illuminate an ellipsoidal portion of the fluid surface (4) as shown in FIG. 1 A. The azimuth angle range can vary from 20° to 90° or more while the elevation angle will vary from 10° to 30°.

Figure 5:
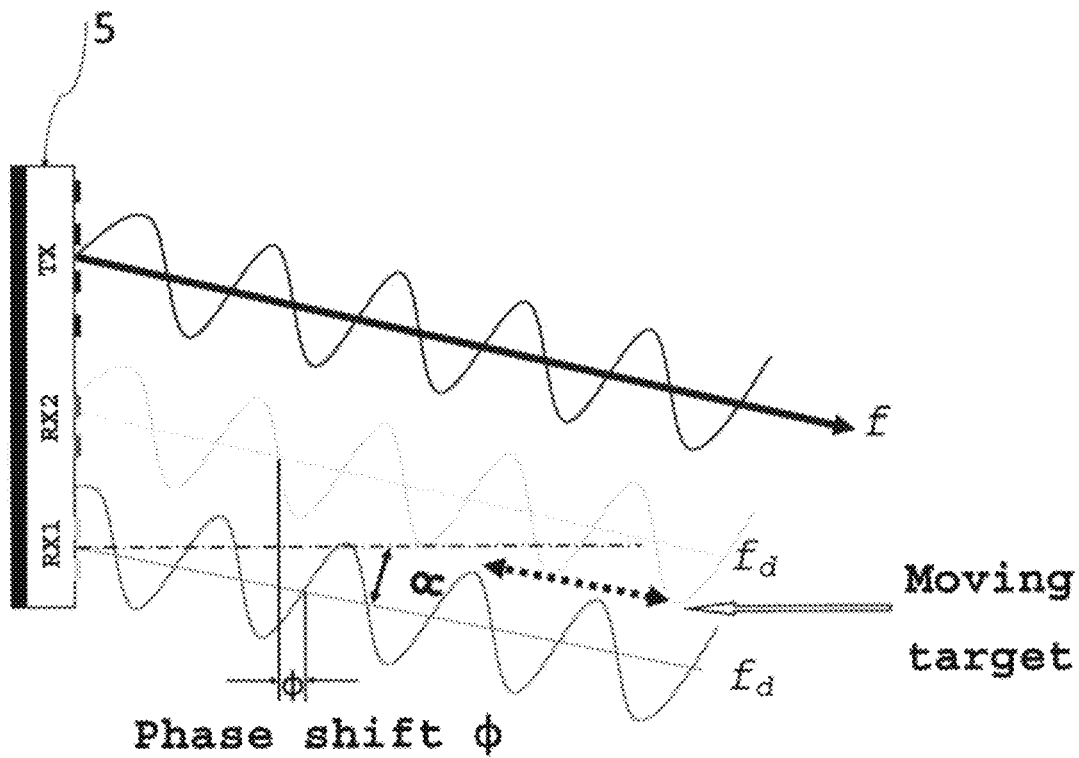
FIG. 5 shows the general principle of measuring angles from phases shifts.

FIG. 5 shows the two receiver patch areas RX1 and RX2 receiving the same signal $f_d$, with the same Doppler frequency shift, but if the signal is coming in at an angle α, the two Doppler carrier waves will have a phase shift φ. This phase shift φ allows to precisely calculate the angle α as shown in FIG. 2 and FIG. 5, between the received beams and the orthogonal direction of the antenna plane. When this angle α is known, the exact position on the fluid surface from the target from which each Doppler carrier wave originates, can be calculated. By analysing all reflected beams, measuring their Doppler frequency shift and calculating the angle, the velocity distribution or surface velocity profile of the fluid flowing through the detection area 4 can be determined as shown in FIG. 1 A and FIG. 2.

As previously mentioned, in a second embodiment, using a patch antenna 5 as shown in FIG. 4 comprising one transmitting patch area 6 and M receiver patch areas 7, an asymmetrical micro-wave beam is directed towards the fluid surface at a defined angle θ, said beam having a main lobe with large azimuth and small elevation. This will allow the main lobe to illuminate an ellipsoidal portion of the fluid surface (4) as shown in FIG. 1 A. The azimuth angle range can vary from 20° to 90° or more while the elevation angle will vary from 10° to 30°.

Figure 6:
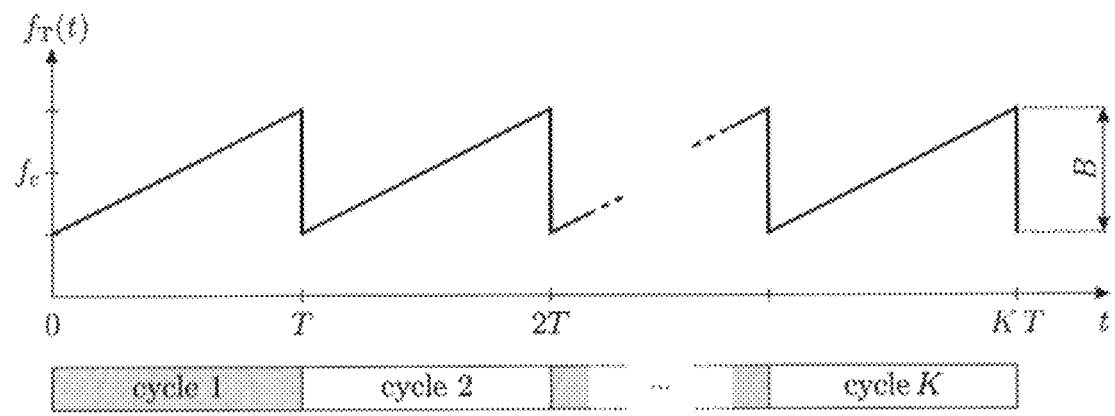
FIG. 6 shows the frequency up-chirps cycle used in some embodiments of the invention.

As illustrated in FIG. 6, the transmit signal of the microwave frontend describes a sequence of K consecutive linear up-chirps specified by the centre frequency $f_c$ of 61 or 77 GHz, the sweep time T and the signal band-width B. During each cycle, N samples are acquired at each of the M receiver channels of the microwave module.

The transmit signal impinging at the surface of the fluid is reflected, generating a damped and time-delayed version of the transmitted chirp captured by the receiving patch areas. Both signals are compared using a homodyne receiver; this results in an intermediate frequency signal defined by the frequency difference between the transmitted and received sampling signal which is proportional to the signal propagation time and thus to the distance between the microwave antenna frontend and the target. The target velocity is determined by evaluating the phase difference of consecutive chirps, and the angle of arrival of the impinging radio frequency signal is calculated by evaluating the phase difference at adjacent receiving antennae of the radar system. Hence, the velocity of the target can be determined for a specific angle and range.

Figure 7:
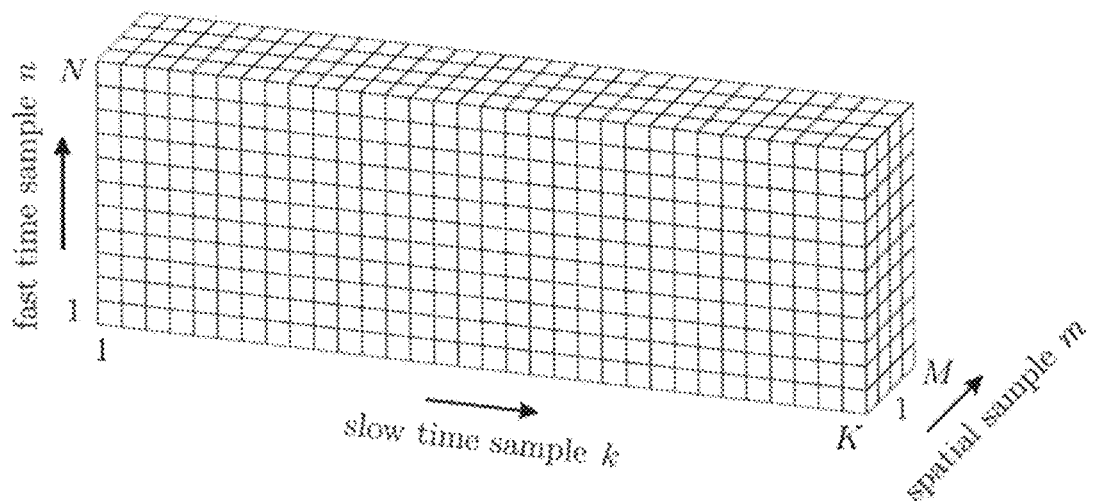
FIG. 7 shows the data space used to represents the data obtained from the sensor off the invention.

This result in three distinct sampling domains called fast-time sample n, slow-time sample k and spatial sample m. Hence, the acquired intermediate frequency signal can be represented by the three-dimensional microwave data cube illustrated in FIG. 7.

The corresponding digitized intermediate frequency signal is modelled by:

$$s[n,m,k]=A \cos(2\pi(\psi_r n+\psi_\alpha m+\psi_v k)) \tag{1}$$

With the signal amplitude A. The normalized frequency $\psi_r$, in the fast-time domain, where n is the sample index with $1 \le n \le N$, is modeled by $$\psi_r = \frac{2rB}{cN} \tag{2}$$

Where c specifies the signal propagation velocity (speed of light) and r is the distance between the microwave module and the target. In the spatial domain, where m is the index of the receiving antenna and M the number of receiving antennae with $1 \le m \le M$, a normalized frequency $\psi\alpha$ arises which is defined by $$\psi_\alpha = \frac{df_c}{c}\sin(\alpha) \tag{3}$$

With d describing the spacing between adjacent receiving antennae of the microwave module, and α specifying the angle of arrival of the impinging radio frequency signal (FIG. 2).

For the slow-time domain, where k is the index of the up-chirp with $1 \le k \le K$, the Doppler effect caused by the movement of the target results in a normalized frequency $\psi_v$ described by $$\psi_v = \frac{2vf_cT}{c}\cos(\alpha)\cos\theta \tag{4}$$

With θ specifying the inclination angle of the microwave module (FIG. 2) and v the target velocity.

Signal Processing

According to equation (1) a normalized frequency arises for each sampling domain of the three-dimensional radar microwave data cube, resulting in a cosinusoidal intermediate frequency signal. Hence, by applying a three-dimensional discrete Fourier transform (DFT), the microwave data cube can be transformed to the spectral domain, whose dimensions correspond to the normalized frequencies $\psi_r$ (fast-time domain), $\psi_\alpha$ (spatial domain), and $\psi_v$ (slow-time domain).

Figure 8:
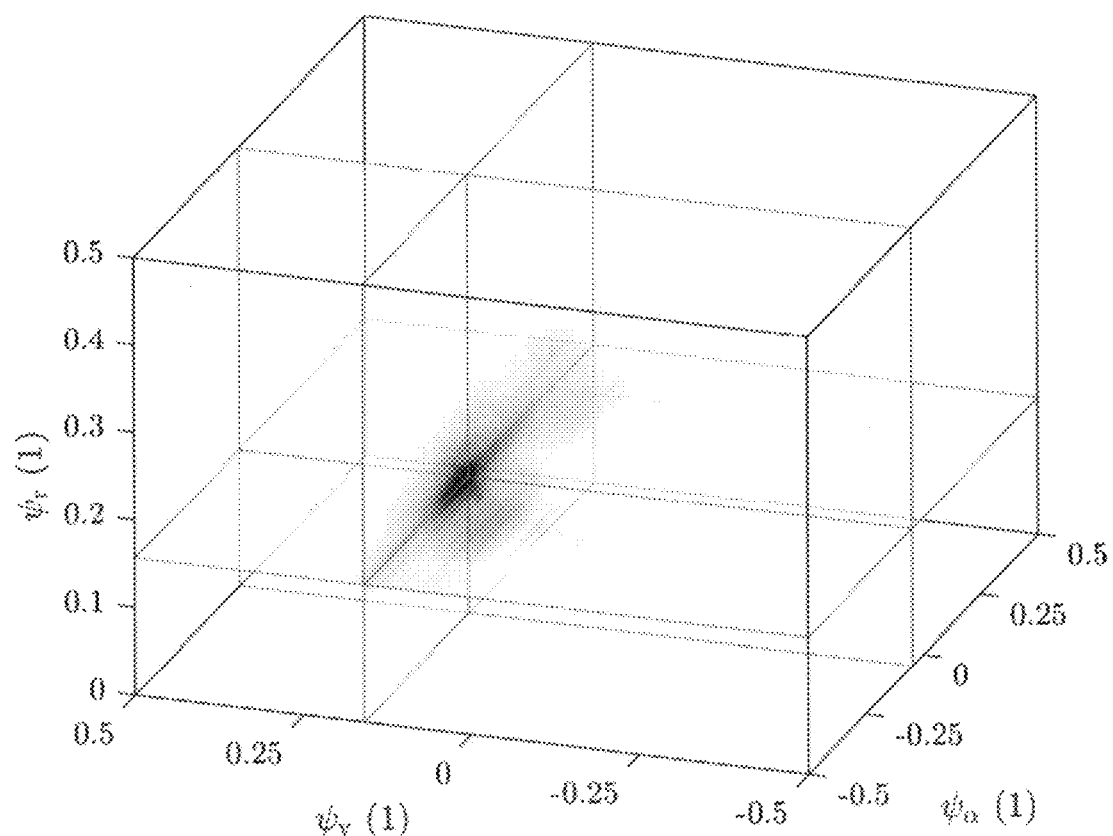
FIG. 8 presents an illustration of selected sub-matrices of the three-dimensional microwave data cube in spectral domain is shown in FIG. 8

An illustration of selected sub-matrices of the three-dimensional microwave data cube in spectral domain is shown in FIG. 8.

Figure 9:
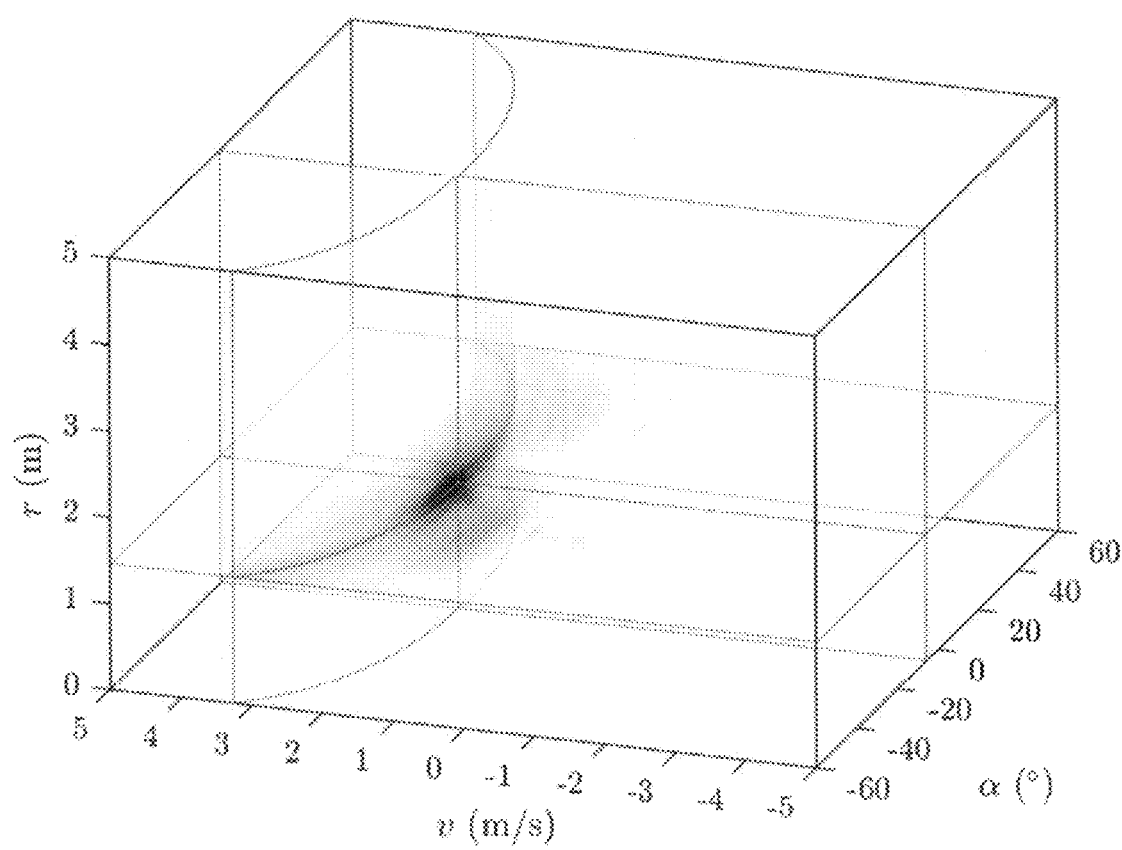
FIG. 9. Shows selected two-dimensional sub-matrices of the three-dimensional radar data cube in a spectral domain, in which the normalized frequencies are converted to range r, angle of arrival is a, and velocity is v at a chosen angle of arrival, evaluated for all velocities.

In FIG. 9, the normalized frequencies $\psi_r$, $\psi_\alpha$, and $\psi_v$ have been converted to range r, angle of arrival $\alpha$, and velocity v according to (2), (3), and (4), respectively.

Design Borders of the Measurement System

Since the signals are processed digitally, the sampling intervals must be selected accordingly in each dimension. With regard to the Nyquist criterion the normalized frequencies must be prevented from changing by more than ½. According to the fast-time domain, this results in a limitation of the distance r between the microwave module and the target defined by $$r \leq \frac{cN}{4B} \tag{5}$$

To achieve maximum versatility of the microwave-based measurement system, the unambiguity range for the angle of arrival $\alpha$ of the impinging radio frequency signal should not be limited.

Figure 10:
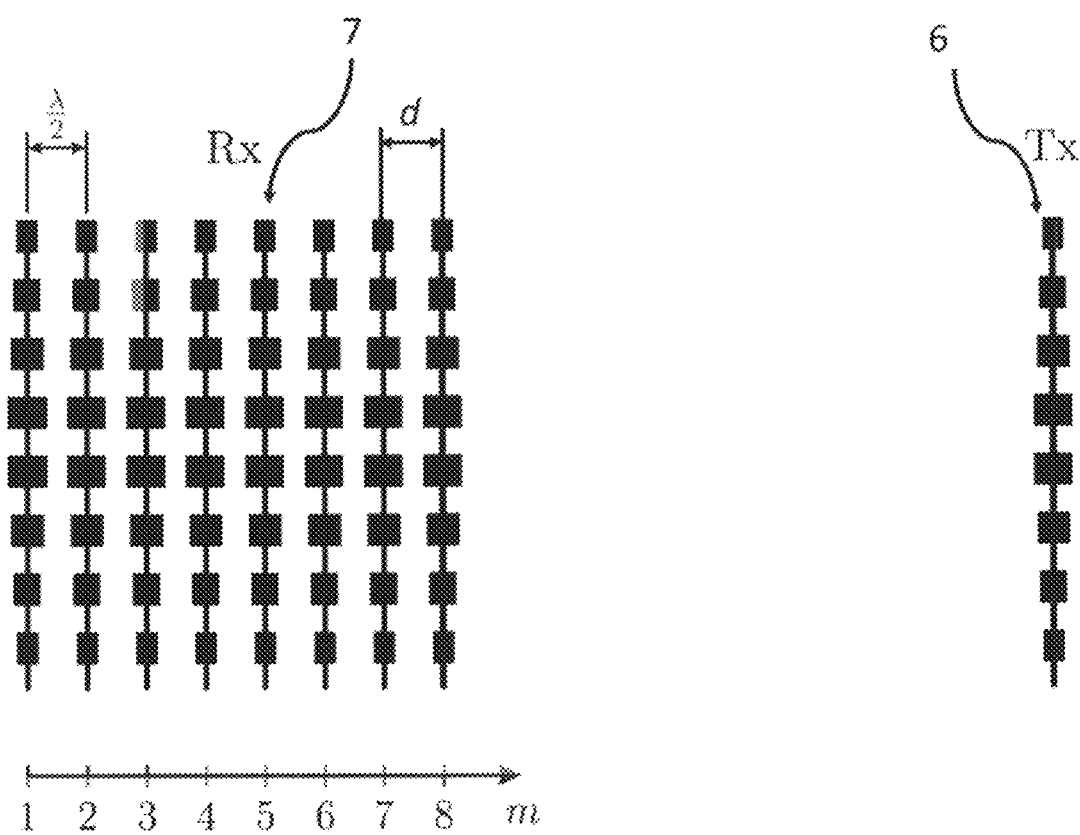
FIG. 10 Tx and Rx patch areas of an example of patch antenna according to the invention.

Thus, the microwave module must be designed such that the spacing d between adjacent receiving antennae of the microwave module is limited by $$d \leq \frac{c}{2f_c} = \frac{\lambda}{2} \tag{6}$$

Where $\lambda$ represents the wavelength of the radio frequency signal and $d=\lambda/2$ the distance by two adjacent receiving patch areas (FIG. 10).

Regarding the slow-time domain, a limit in the movement of the target relative to the microwave module between consecutive transmit cycles and thus of the target velocity arises with $$|v| \leq \frac{c}{4f_c T \cos(\theta)} \tag{7}$$

By adjusting the number of samples N and the sweep time T, the measurement system can be setup to allow velocity measurements in accordance with the Nyquist criterion for a given scenario.

Resolution of the Measurement System

One important parameter of the radar-based fluid surface velocity measurement system is the target resolution, which describes the ability to distinguish between multiple targets that are located within the radar beam. If the targets cannot be distinctly separated, the measurement results will be significantly affected. Basically, the problem of target resolution is a problem of resolving multiple frequencies in the output spectrum. Therefore, the achievable resolution mainly depends on the frequency measurement algorithm used. For the discrete Fourier transform, which is commonly used for frequency calculations, the frequency resolution equals approximately one DFT bin, which is the frequency difference of two adjacent lines in the discrete DFT magnitude spectrum. Our measurement system enables to distinguish multiple targets in each dimension of the three-dimensional micro-wave data cube in spectral domain. The fast time domain, enables to distinguish between objects if their distances to the radar module differ by more than $$\delta_r = \frac{c}{2B} \tag{8}$$

In order to be able to separate targets in special domain, their angle of arrival $\alpha$ of the impingeing radio frequency signals must differ by more than $$\delta_\alpha = \arcsin\left(\frac{c}{df_c M}\right) \tag{9}$$

Strictly speaking, this is the lower limit of the resolution in special domain, which is only valid in the range of $\alpha \sim 0°$.

Regarding the slow time domain, we can distinguish between objects if their movement $\Delta r$ relative to the radar module between consecutive transmit cycles varies by more than $$\delta_{\Delta r} = \frac{c}{2f_c K} \tag{10}$$

As a note, above results are valid only if no window functions are applied to the measurement data before computing the DFT spectrum. If window functions are used, their effects have to be considered since they broaden the target spectrum, and thus degrade the achievable resolution. If model based high resolution algorithms are used, it is possible to go beyond the above-mentioned resolution limits. Nevertheless, the discrete Fourier transform is by far the most common and widest used method for frequency calculations, because it can be implemented by the fast Fourier transform algorithm which is computationally efficient and widespread available on many signal processing systems.

Test Measurement Setups and Experimental Results

In order to validate this approach(es) of measuring the fluid surface velocity distribution by a non-invasive radar measuring system as in the second embodiment and first arrangement, and measuring the velocity distribution within the illuminates area of the fluid surface and the distance from the radar device to the fluid surface in the second embodiment and second arrangement, test measurements have been conducted.

In order to evaluate the performance of the radar-based surface velocity measurement system for fluid, experiments were carried out at a channelized stream. To this end, for both types of arrangements, the radar module was positioned at a height of h=0.91 m above the surface of the water, with the radar beam pointing upstream. To allow a comparison of both arrangements, the same parameters of the radar system were chosen:

$f_c$=77 GHz
B=2 GHz
M=8
N=128
K=8192
T=250 µs
$\theta$=40°
d=$\lambda$/2

Independently of the type of arrangement, these parameters result in a limitation of the distance between the radar module and the target r of 4.80 m, while the system was designed to provide an unambiguity range for the angle of arrival α of the impinging radio frequency signal between −180° and +180°. The following values were calculated for the center of the radar beam with α=0° wherein both arrangements yield the same limitations. In this case, the chosen parameters result in a detectable surface velocity v of +/−5.08 m/s. Regarding the ability of the radar system to distinguish between multiple targets, these parameters yield a resolution in range measurement with $\delta_r$=7.49 cm, in special domain with $\delta_\alpha$=14.5°, and in velocity measurement with $\delta_v$=1.24 mm/s.

Second Embodiment, First Arrangement, Patch Areas Orthogonal to the Fluid Flow Direction.

Especially in open channels, the surface velocity is not constant for the cross section of the channel. Therefore, the measurement system being able to measure the surface velocity profile for the entire channel cross section would present a significant benefit. To this end, the radar system according to the present invention is positioned above the stream so that the main lobe of the transmitting antenna illuminates the fluid, while the receiving antennae are arranged orthogonal to the direction of flow. This is shown in schematic form in FIG. 1 A and FIG. 2.

The use of this measurement arrangement makes it possible to determine the movement Δr of the target relative to the radar module between consecutive transmit cycles for arbitrary angles of arrival α and ranges r within the design borders specified previously. Thus, by evaluating the estimated normalized frequency in slow time domain $\psi_v$ at different ranges and angles, a surface velocity profile can be determined. Using the relationship:

$$\Delta r = vT\cos(\theta)\cos(\alpha) \tag{11}$$

with θ specifying the inclination angle of the radar module, results according to (4) in the measurement $\hat{v}$ of the surface velocity $$\hat{v}(\alpha) = \frac{\hat{\psi}_v(r|\alpha)c}{2f_cT\cos(\theta)\cos(\alpha)} \tag{12}$$

at a chosen angle of arrival, evaluated for all ranges. With respect to (7), a limit for the unambiguously determinable surface velocity arises with $$|v| \leq \frac{c}{4f_cT\cos(\theta)\cos(\alpha)} \tag{13}$$

and according to (10) the resolution in velocity measurement yields $$\delta_v = \frac{c}{2f_cTK\cos(\theta)\cos(\alpha)} \tag{14}$$

Obviously, especially in open channels, disturbing reflections generated by stationary or moving scatters can occur. However, they can be distinguished from the target of interest if they differ in at least one of the three dimensions of the radar data cube in spectral domain. More precisely, either the range r, the angle of arrival α or the velocity $v$ of the scatter must differ from the target of interest by more than the corresponding resolutions $\delta_r$, $\delta_\alpha$, or $\delta_v$, respectively. Based on the same measurement data set as used in FIG. 8, an illustration of selected two-dimensional sub-matrices of the three-dimensional radar data cube in spectral domain is shown in FIG. 9, where the normalized frequencies $\psi_r$, $\psi_\alpha$, and $\psi_v$ have been converted to range r, angle of arrival α, and velocity v according to (2), (3), and (12), respectively.

Experimental Results

For the type of installation, in which the radar module is positioned above the stream so that the receiving antennae are arranged orthogonal to the direction of flow, the normalized frequencies corresponding to the position of the maximum absolute value of the radar data cube in spectral domain are determined. This yields measurements for the surface velocity with $\hat{v}$=1:64 m/s, for the distance between the radar module and the target with r̂=1:46 m, and for the angle of arrival of the impingeing radio frequency signal with α̂=−5:38°. These values are the basis for the selection of the two-dimensional sub-matrices shown in FIG. 9. The measured surface velocity is consistent with the results of a commercial hand-held electromagnetic current meter.

Figure 11:
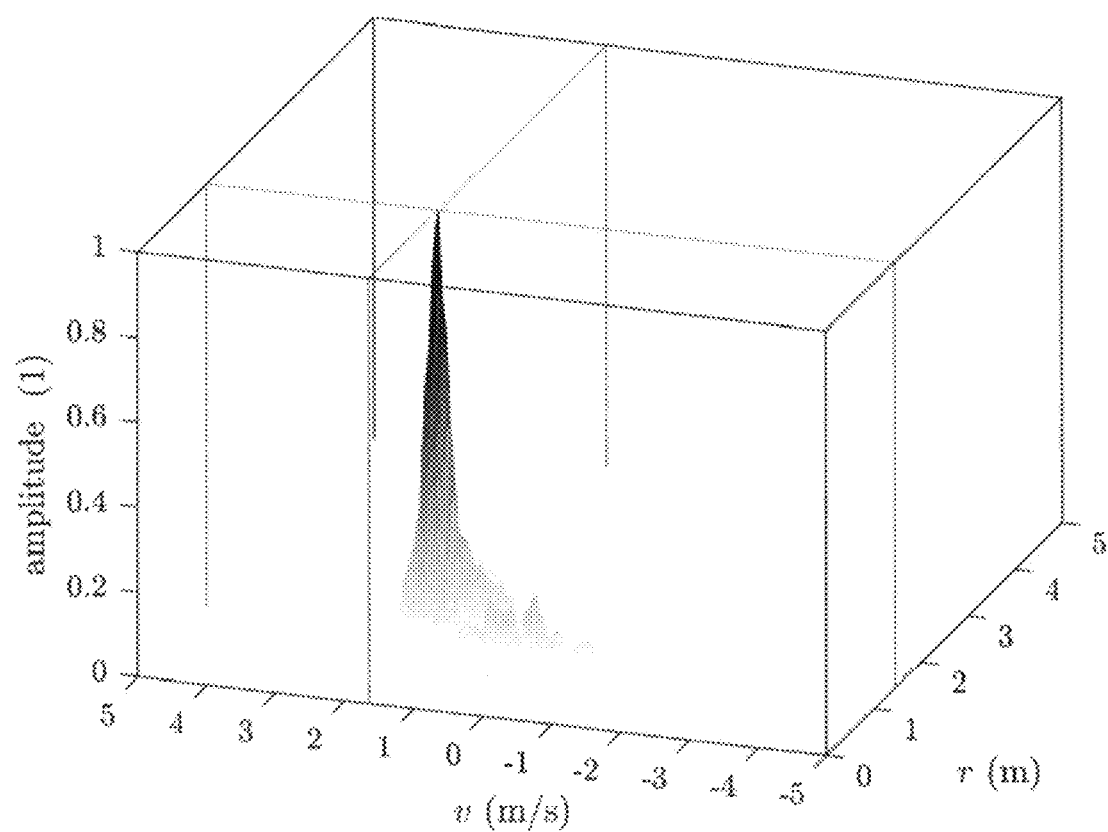
FIG. 11 illustrates a range-Doppler map according to an example of the invention.

An obvious interpretation of the radar data cube in spectral domain is the evaluation at a specific angle of arrival, which corresponds to the well-known range-Doppler map illustrated in FIG. 11. In principle, based on the determined range r̂ and the known inclination angle θ of the radar module, the height of the measurement system above the surface of the water could also be determined.

Figure 12:
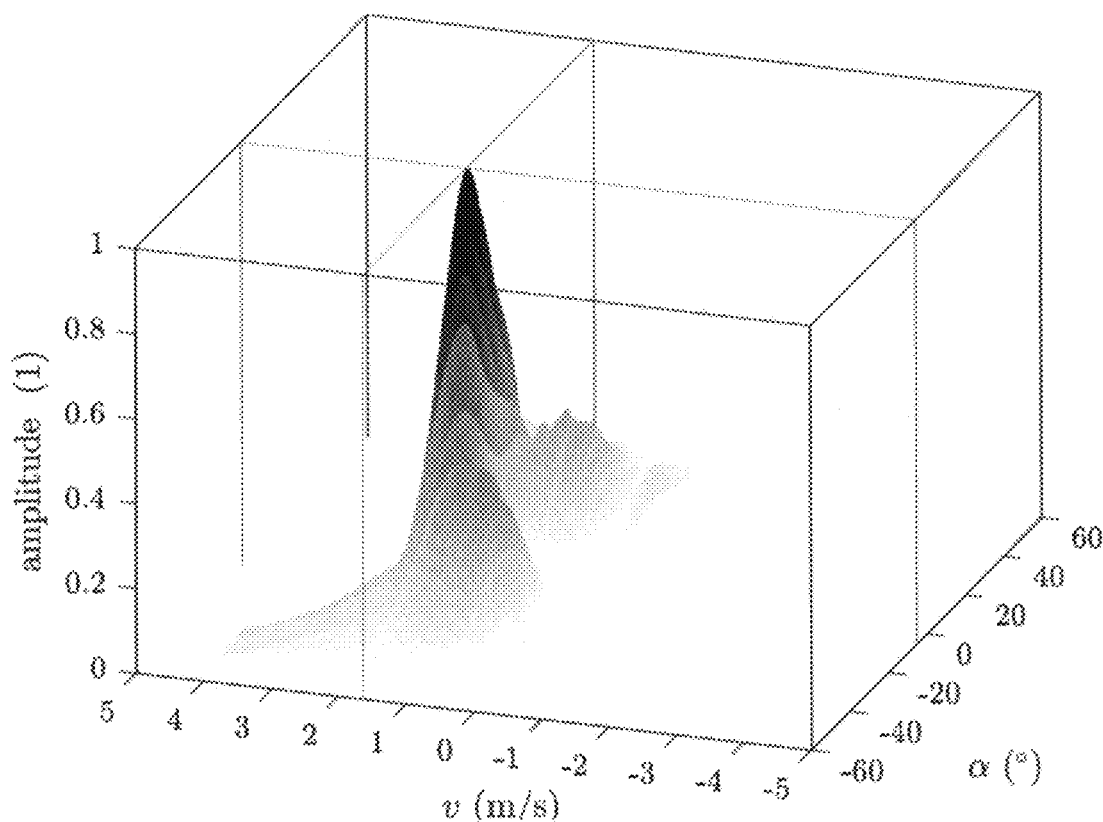
FIG. 12 shows the two-dimensional map, velocity height and amplitude of an example of the description.

Since the presented measurement system also estimates the angle of arrival α of the impingeing radio frequency signal, a surface velocity profile can be determined. As shown in FIG. 12. for a range of r=1:46 m, at angles α around 0° an almost constant surface velocity is observed. For higher values of α no relevant scatters are present at this distance due to the steep slope of the artificial surrounding of the stream.

Second Embodiment, Second Arrangement, Patch Areas Parallel to the Fluid Flow Direction.

Figure 13:
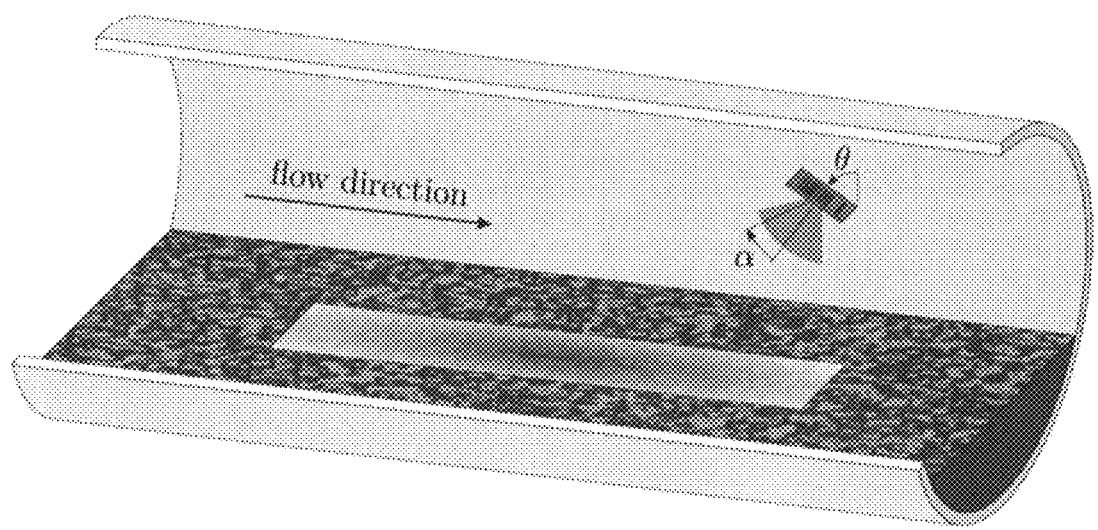
FIG. 13 shows the arrangement of the channel of an example of the description.

It is important to measure the fluid level in addition to the velocity distribution in the part of the fluid flow illuminated by the main lobe so that the volumetric flow discharge can be calculated if the pipe or channel profile is known. To this end, the radar system is positioned above the stream so that antennae are arranged parallel to the direction of flow. This is shown in schematic format in FIG. 13.

Again, using this measurement arrangement makes it possible to determine the movement Δr of the target relative to the radar module between consecutive transmit cycles for arbitrary angles of arrival α and ranges r within the design borders specified previously. Using the relationship $$\Delta r = vT\cos(\theta-\alpha) \tag{15}$$

and $$h = r\sin(\theta-\alpha) \tag{16}$$

with h describing the height of the radar module above the surface of the fluid, results according to (2) in a measurement of the radar height $$\hat{h}(\alpha) = \frac{\hat{\psi}_r(v \mid \alpha) cN \sin(\theta - \alpha)}{2B} \quad (17)$$

Regarding the slow time domain, with respect to (4) the measurement of the surface velocity yields $$\hat{v}(\alpha) = \frac{\hat{\psi}_v(r \mid \alpha) c}{2 f_c T \cos(\theta - \alpha)} \quad (18)$$

at a chosen angle of arrival, evaluated for all ranges. Thus, it is possible to measure the height h of the radar module above the surface of the fluid and the surface velocity v for each angle of arrival α separately. However, since it can be assumed that the target velocity and the radar height remain unchanged for different angles of arrival, a superposition of the corresponding magnitude spectra can be performed, yielding a significant improvement of the accuracy of the measurements for velocity and radar height. According to (7), a limit for the unambiguously determinable surface velocity arises with $$|v| \le \frac{c}{4 f_c T \cos(\theta - \alpha)} \quad (19)$$

and with respect to (10) the resolution in velocity measurement yields $$\delta_v = \frac{c}{2 f_c T K \cos(\theta - \alpha)}. \quad (20)$$

Experimental Results

Figure 14:
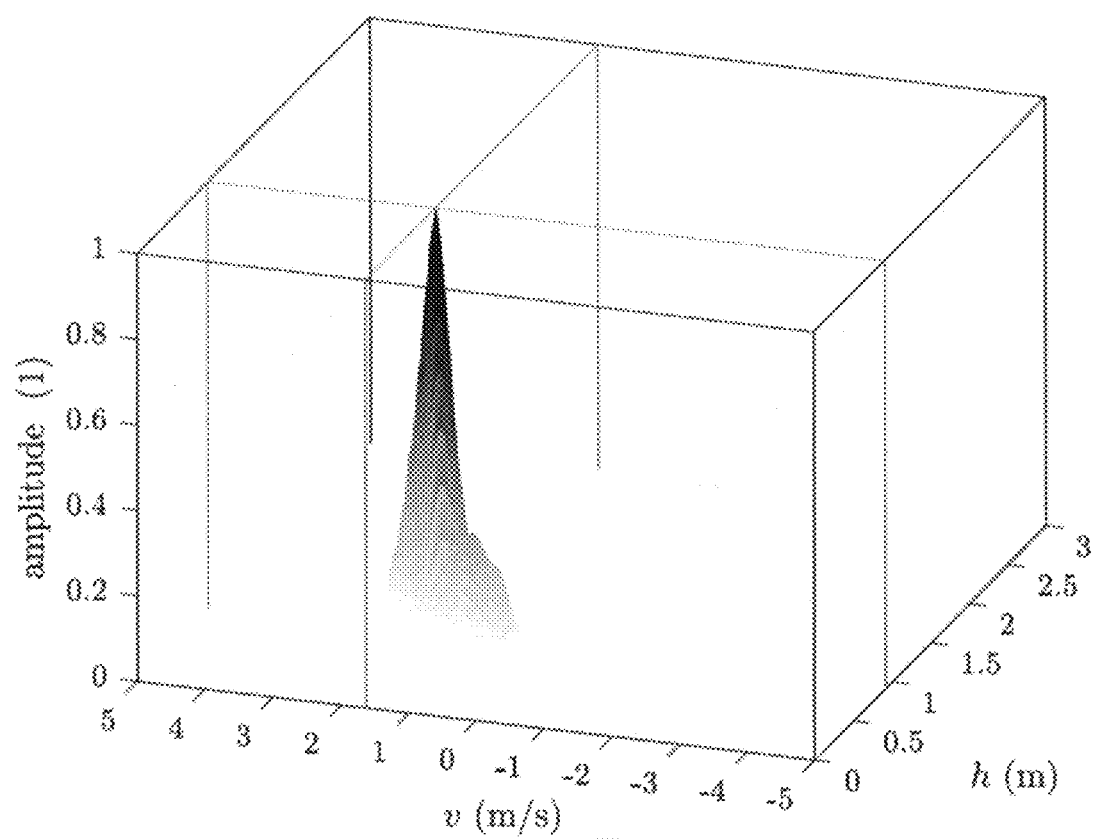
FIG. 14 shows the two-dimensional map, velocity height and amplitude of an example of the description.

For the type of installation, in which the radar module is positioned above the stream so that the receiving antennae are arranged parallel to the direction of flow, a superposition of the magnitude spectra for the considered angels of arrivals α is performed. Determining the position of the maximum value of the resulting two-dimensional map, which is illustrated in FIG. 14, yields measurements for the surface velocity with v=1:63 m/s, and for the height of the radar module above the surface of the water with ĥ=0:916 m. The measured surface velocity is consistent with the results of a commercial hand-held magnetic current meter and with the value determined using the orthogonal arrangement of the receiving antennae. The measured radar height is very close to the expected value of h=0:91 m, especially as, due to waves present at the surface of the water, the determination of the actual fluid level is inherently imprecise.

The invention claimed is:

1. A method for measuring surface velocity of a fluid flowing through a pipe or a channel, wherein said fluid has a free surface, comprising the steps of:
   sending a microwave beam by a patch antenna comprising at least one emitting patch area and at least two receiving patch areas parallel to the emitting patch area;
   placing at least two microwave patch area emitters orthogonally to each other, the first patch area emitter being located in a vertical plane parallel to the flow and the second patch area emitter being located in a horizontal plane parallel to the flow; and placing at least two sets of receiving antennae respectively parallel to the first and second patch antennae emitters;
   receiving microwave signals reflected by the moving fluid free surface on the at least two receiving patch areas separated by a predetermined distance, said patch antenna being either perpendicular to the flow in horizontal planes or in vertical planes parallel to an average fluid velocity;
   for each microwave signal received on the at least two receiving patch areas, determining a phase shift between the microwave signals received by the at least two receiving patch areas allowing calculation of azimuth angles to determine an azimuth position of reflectors on the fluid surface or allowing calculation of an elevation angle corresponding to each signal received on the receiving area;
   for each microwave signal received on the at least two receiving patch areas determining a Doppler frequency shift between the sent microwave beam and the received microwave signal;
   calculating, based on the Doppler frequency shifts and the corresponding phase shifts, lateral and/or longitudinal distribution of the surface velocity of the fluid;
   wherein measurement of different phase shifts, and frequency shifts allows determination of individual target velocities, angle of arrival and distance to the fluid.

2. The method according to claim 1, wherein the sent microwave beam comprises a sequence of consecutive linear frequency-modulated continuous waves and the received signal is a time delayed version of a transmitted chirp, reflector velocity being determined by evaluating the phase difference of consecutive chirps.

3. The method according to claim 2, wherein the sent microwave beam and the received signals are compared using a homodyne receiver, resulting in an intermediate frequency signal defined by a frequency difference between the transmitted and received signals, which is proportional to a signal propagation time and thereby to a distance between the microwave patch antenna and the target.

4. The method according to claim 1, wherein the sent microwave beam has an azimuth comprised between 20° and 90° and an elevation angle comprised between 10° and 30°.

5. The method according to claim 1, wherein the microwave beams have a frequency comprised between 20 GHz and 80 GHz.

6. The method according to claim 5, wherein the microwave signals have a center frequency selected from the group consisting of 24.125 GHZ, 61 GHz, and 77 GHz.

7. The method according to claim 6, wherein a spacing between adjacent receiving patch areas of the at least two receiving patch areas is equal to about one-half of a wavelength of a centre frequency signal.

8. The method according to claim 7, comprising the steps of making a first complete set of measurements and calculations, rotating the antenna by 90° around a normal axis and making a second set complete set of measurements and calculations.

9. The method according to claim 1, wherein the at least two receiving patch areas are located in vertical planes parallel to the fluid flow allowing determination of individual target velocities and an azimuth of arrival.

10. The method according to claim 9, comprising the steps of making a first complete set of measurements and calculations, rotating the antenna by 90° around a normal axis and making a second set complete set of measurements and calculations.

11. The method according to claim 1, wherein the at least two receiving patch areas are located in horizontal planes parallel to the fluid flow allowing determination of individual target velocities and a distance between the sensor and the fluid.

12. The method according to claim 1, wherein the microwave beams have a frequency comprised between 24.125 GHz and 77 GHz.

13. A channel transporting a fluid comprising a free surface, the channel comprising a sensor for measuring surface velocities of the fluid, the sensor being located at a height above the fluid surface, and comprising:
- a patch antenna having a normal vector directed toward a middle of the channel and impinging the fluid surface at a predetermined elevation angle, said patch antenna comprising at least one emitter patch area and at least two receiver patch areas parallel to the emitter patch area, wherein the patch antenna comprises at least two microwave patch area emitters placed orthogonally to each other, the first patch area emitter being located in a vertical plane parallel to flow and the second patch antenna emitter being located in a horizontal plane parallel to the flow, and at least two sets of receiving antennae respectively parallel to the first and second patch antennae emitters;
- a microwave generator connected to the at least one emitter patch area;
- a homodyne receiver for determining phase and frequency shifts between a signal emitted in use by the emitting area and signals received in use by the at least two receiving patch areas;
- a processing unit for calculating velocity distribution of the fluid surface from the phase and frequency shift determined by the homodyne receiver.

14. The channel according to claim 13, wherein the at least two receiving patch areas are located in vertical planes parallel to fluid flow allowing the determination of individual target velocities and the azimuth of arrival.

15. The channel according to claim 13, wherein the at least two receiving patch areas are located in horizontal planes parallel to fluid flow allowing determination of individual target velocities and a distance between the sensor and the fluid.

* * * * *